(12) United States Patent
Caldwell

(10) Patent No.: US 9,940,668 B2
(45) Date of Patent: Apr. 10, 2018

(54) SWITCHING BETWEEN DATA AGGREGATOR SERVERS

(71) Applicant: MX Technologies, Inc., Lehi, UT (US)

(72) Inventor: John Ryan Caldwell, Provo, UT (US)

(73) Assignee: MX TECHNOLOGIES, INC., Lehi, UT (US)

( * ) Notice: Subject to any disclaimer, the term of this patent is extended or adjusted under 35 U.S.C. 154(b) by 0 days.

(21) Appl. No.: 15/058,000

(22) Filed: Mar. 1, 2016

(65) Prior Publication Data

US 2016/0180453 A1 Jun. 23, 2016

Related U.S. Application Data

(63) Continuation of application No. 14/036,951, filed on Sep. 25, 2013.
(Continued)

(51) Int. Cl.
*G08G 1/017* (2006.01)
*G06Q 40/00* (2012.01)
(Continued)

(52) U.S. Cl.
CPC ....... *G06Q 40/00* (2013.01); *G06F 17/30542* (2013.01); *G06F 17/30554* (2013.01);
(Continued)

(58) Field of Classification Search
CPC . Y10S 707/99945; H04W 8/08; G06Q 40/02; G06Q 10/00
See application file for complete search history.

(56) References Cited

U.S. PATENT DOCUMENTS 6,170,017 B1 1/2001 Dias et al.
6,820,125 B1 11/2004 Dias et al.
(Continued)

FOREIGN PATENT DOCUMENTS

JP 2010-33605 A 2/2010
JP 2010-224881 A 10/2010
(Continued)

OTHER PUBLICATIONS

SD Billing Document consolidation and Splitting Technical Solution guide; 45 pages by Smith consulting Group, Inc; 2005.*
(Continued)

*Primary Examiner* — Mohammad Z Shaikh
*Assistant Examiner* — Mary M Gregg
(74) *Attorney, Agent, or Firm* — Kunzler, PC

(57) ABSTRACT

Switching between data aggregator servers. A method for switching between data aggregator servers may include tracking a first financial account using a PFM server, receiving, at the PFM server, first account identification data and first account transaction data for the first financial account from a first data aggregator server over a network, detecting, at the PFM server, that the first account transaction data of the first data aggregator server has become unavailable to the PFM server over the network and that a second data aggregator server is currently available to the PFM server over the network, and in response to the detecting, switching, at the PFM server, from the first data aggregator server to a second data aggregator server, the second data aggregator server configured to send data for the same financial accounts with different data fields and/or with different data formats than the first data aggregator server.

16 Claims, 11 Drawing Sheets

Related U.S. Application Data

(60) Provisional application No. 61/744,398, filed on Sep. 25, 2012.

(51) Int. Cl.
    *G06Q 40/02* (2012.01)
    *G06Q 20/14* (2012.01)
    *G06F 17/30* (2006.01)
    *G06Q 20/10* (2012.01)
    *H04L 12/26* (2006.01)
    *H04L 12/709* (2013.01)

(52) U.S. Cl.
    CPC ....... *G06F 17/30867* (2013.01); *G06Q 20/10* (2013.01); *G06Q 20/14* (2013.01); *G06Q 40/02* (2013.01); *G06Q 40/12* (2013.12); *H04L 43/0894* (2013.01); *H04L 43/16* (2013.01); *H04L 45/245* (2013.01)

(56) References Cited

U.S. PATENT DOCUMENTS

| | | | |
|---|---|---|---|
| 7,185,104 B1 | 2/2007 | Thorup et al. | |
| 7,266,602 B2 | 9/2007 | Givoly | |
| 7,349,974 B2 | 3/2008 | Dias et al. | |
| 7,451,103 B1* | 11/2008 | Boyle | G06Q 20/10 705/35 |
| 7,673,327 B1 | 3/2010 | Polis et al. | |
| 7,792,717 B1 | 9/2010 | Hankins et al. | |
| 7,908,647 B1 | 3/2011 | Polis et al. | |
| 8,001,040 B2 | 8/2011 | Keithley | |
| 8,051,017 B2 | 11/2011 | Munson et al. | |
| 8,086,528 B2 | 12/2011 | Barrett et al. | |
| 8,165,958 B1 | 4/2012 | McLaughlin et al. | |
| 8,340,099 B2* | 12/2012 | Black | H04L 43/0888 370/395.2 |
| 8,447,025 B2 | 5/2013 | Shaffer et al. | |
| 8,458,084 B2 | 6/2013 | Yakubov | |
| 8,458,085 B1 | 6/2013 | Yakubov | |
| 8,458,292 B2 | 6/2013 | Polis et al. | |
| 9,361,646 B2 | 6/2016 | Caldwell | |
| 9,369,458 B2 | 6/2016 | McCallum | |
| 9,692,815 B2 | 6/2017 | Caldwell | |
| 9,741,073 B2 | 8/2017 | Caldwell | |
| 2001/0023414 A1 | 9/2001 | Kumar et al. | |
| 2003/0130916 A1 | 7/2003 | Block et al. | |
| 2003/0204460 A1* | 10/2003 | Robinson | G06F 17/30914 705/35 |
| 2005/0234824 A1 | 10/2005 | Gill et al. | |
| 2006/0116949 A1 | 6/2006 | Wehunt et al. | |
| 2007/0100748 A1 | 5/2007 | Dheer et al. | |
| 2007/0100856 A1* | 5/2007 | Ebbesen | G06Q 10/00 |
| 2007/0294379 A1* | 12/2007 | Jiang | H04L 41/04 709/223 |
| 2008/0033871 A1* | 2/2008 | Birbara | G06Q 20/10 705/39 |
| 2008/0043737 A1* | 2/2008 | George | H04L 69/32 370/392 |
| 2009/0064271 A1 | 3/2009 | Ng et al. | |
| 2009/0108064 A1 | 4/2009 | Fernandes et al. | |
| 2011/0179020 A1* | 7/2011 | Ozzie | G06F 17/3089 707/723 |
| 2011/0204138 A1* | 8/2011 | Ukuda | G06Q 40/02 235/379 |
| 2011/0238620 A1 | 9/2011 | Ramineni et al. | |
| 2011/0289214 A1 | 11/2011 | Freedman | |
| 2011/0302105 A1 | 12/2011 | Yakubov | |
| 2012/0072575 A1* | 3/2012 | King | G06F 11/3476 709/224 |
| 2012/0089648 A1* | 4/2012 | Kozan | G06F 17/30997 707/802 |
| 2012/0117228 A1* | 5/2012 | Gabriel | H04L 47/00 709/224 |
| 2012/0278749 A1 | 11/2012 | Paakonen et al. | |
| 2012/0297026 A1 | 11/2012 | Polis et al. | |
| 2013/0046661 A1 | 2/2013 | Levin | |
| 2013/0297532 A1 | 11/2013 | Snyder | |
| 2013/0325881 A1* | 12/2013 | Deshpande | G06F 17/30292 707/755 |
| 2014/0095363 A1 | 4/2014 | Caldwell | |
| 2014/0095486 A1 | 4/2014 | Caldwell | |
| 2014/0195426 A1* | 7/2014 | Caldwell | G06Q 20/10 705/42 |
| 2016/0285747 A1 | 9/2016 | Caldwell | |

FOREIGN PATENT DOCUMENTS

| | | |
|---|---|---|
| JP | 2011-204110 A | 10/2011 |
| WO | 2014052493 A1 | 4/2014 |

OTHER PUBLICATIONS

United States Patent and Trademark Office, Office Action, dated Dec. 3, 2015, 29 pages, in U.S. Appl. No. 14/036,951.
European Application No. 13841343.0, Extended European Search Report dated May 3, 2016.
U.S. Appl. No. 15/167,650 Office Action dated Sep. 19, 2016.
U.S. Appl. No. 15/174,620 Office Action dated Oct. 6, 2016.
U.S. Appl. No. 14/036,948 Notice of Allowance dated May 3, 2016.
PCT/US13/61751 International Search Report and Written Opinion dated Feb. 7, 2014.
PCT/US16/61908 International Search Report and Written Opinion dated Dec. 16, 2016.
JP Patent Application No. 2015-533304 Office Action dated Nov. 8, 2016.
JP Patent Application No. 2015-533304 Notice of Allowance dated Jul. 28, 2017.
CA Patent Application No. 2,884,450 Examiners Report dated Jul. 10, 2017.
NZ Patent Application No. 707185 Further Examination Report dated Aug. 23, 2017.
U.S. Appl. No. 15/167,650 Notice of Allowance dated Feb. 23, 2017.
NZ Patent Application No. 707185 First Examination Report dated Feb. 9, 2017.
U.S. Appl. No. 15/174,620 Notice of Allowance dated Apr. 10, 2017.

* cited by examiner

SWITCHING BETWEEN DATA AGGREGATOR SERVERS

CROSS-REFERENCE TO RELATED APPLICATIONS

This application is a continuation of U.S. patent application Ser. No. 14/036,951, filed Sep. 25, 2013, which claims the benefit of U.S. Provisional Application No. 61/744,398, filed Sep. 25, 2012, each of which is incorporated herein by reference in its entirety.

FIELD

The disclosure relates generally to methods, systems, and computer program products for moving one or more user accounts from one institution to another over a network of computers. The disclosure relates more specifically, but not necessarily entirely, to methods, systems and computer program products that receive a request from a user to move one or more accounts between a first financial institution and a second financial institution, retrieve old account data corresponding to the request from the first financial institution, scrape field values from the old account data, populate form fields within a plurality of new accounts with field values retrieved from the computer memory as required by the second financial institution in order to create the new accounts with the second financial institution, and close old accounts with the first financial institution.

BACKGROUND

Many people/users are associated with multiple accounts, such as email, frequent flyer or financial accounts, such as checking accounts, savings accounts, retirement accounts, money market accounts, certificate of deposit accounts, and various debt accounts, by way of example, for homes, automobiles, boats, educational expenses, credit cards and other personal property. Further, many of these users may have insurance accounts, such as life, home, health, automobile or other insurance accounts with a financial institution. Advances in technology have allowed institutions and businesses, such as banking and financial institutions, to provide their customers with easy access to their various accounts via software applications and other online access. The result is that a single user may have a proliferation of accounts at more than one institution or business, including banking or financial institutions.

For example, a user may have a checking account and a savings account at a local or regional banking institution. That same user may have a mortgage account from a national lender for a home, a financial loan or a debt account for an automobile, and a financial loan or a debt account for college educational expenses. The user may also have a life insurance account, a health insurance account and a health savings account all at different banking or financial institutions. Further, the user may have one or more email accounts, frequent flyer accounts and so forth all with passwords or personal identification numbers that must be remembered by a user. Accordingly, it is difficult for users to maintain all of these various accounts. In response to the problem of proliferation of user accounts, personal financial management (PFM) providers have provided many with a solution of bringing all of a user's financial and other account information together in a single location. A PFM is a computer interface for assisting users with financial services and information.

A further problem arises when a user decides to change or switch from one institution, such as banking institution, a financial institution or data aggregator, to another. The process of changing account information, from one institution to another, whether directly or through a third party data management provider, can be difficult and time consuming for a user or institution, such as a banking or financial institution.

Due to the proliferation of the internet and the number of user accounts that are available through software applications or online access through various providers, data aggregators have become increasingly important in order to handle the large amount of data generated by millions of user accounts. Data aggregators are involved in compiling information and data from detailed databases regarding individuals and providing or selling that information to others, such as personal financial management providers. The potential of the internet to consolidate and manipulate information has a new application in data aggregation, which is also known as screen scraping. The internet and PFM providers allow users the opportunity to consolidate their usernames and passwords, or PINs in one location. Such consolidation enables consumers to access a wide variety of PIN-protected websites containing personal information by using one master PIN on a single website, such as through a PFM provider or otherwise. Online account providers include financial institutions, stockbrokers, airline and frequent flyer and other reward programs, and e-mail accounts. Data aggregators may gather account or other information about individuals from designated websites by using account holders' PINs, and then making the users' account information available to them at a single website operated by the aggregator or other third party at an account holder's request. Aggregation services may be offered on a standalone basis or in conjunction with other financial services, such as portfolio tracking and bill payment provided by a specialized website, or as an additional service to augment the online presence of an enterprise established beyond the virtual world, such as a banking or financial institution. Many established companies with an internet presence recognize the value of offering an aggregation service to enhance other web-based services and attract visitors to their websites. Offering a data aggregation service to a website may be attractive because of the potential that it will frequently draw users of the service to the hosting website. However, a problem may arise when a data aggregator's services are temporarily halted, become too expensive for third party businesses to utilize or otherwise become unavailable for some reason. The result is that account information may need to be moved by a user or third party to another institution, such as a personal financial management provider or financial institution.

Accordingly, the disclosure relates to a method and system for moving at least one account from one institution to another over a network of computers. The features and advantages of the disclosure will be set forth in the description which follows, and in part will be apparent from the description, or may be learned by the practice of the disclosure without undue experimentation. The features and advantages of the disclosure may be realized and obtained by means of the computing systems and combinations of firmware, software and hardware, particularly pointed out in the appended claims.

BRIEF DESCRIPTION OF THE DRAWINGS

Non-limiting and non-exhaustive implementations of the disclosure are described with reference to the following figures, wherein like reference numerals refer to like parts throughout the various views unless otherwise specified. Advantages of the disclosure will become better understood with regard to the following description and accompanying drawings where.

DETAILED DESCRIPTION

Figure 1:
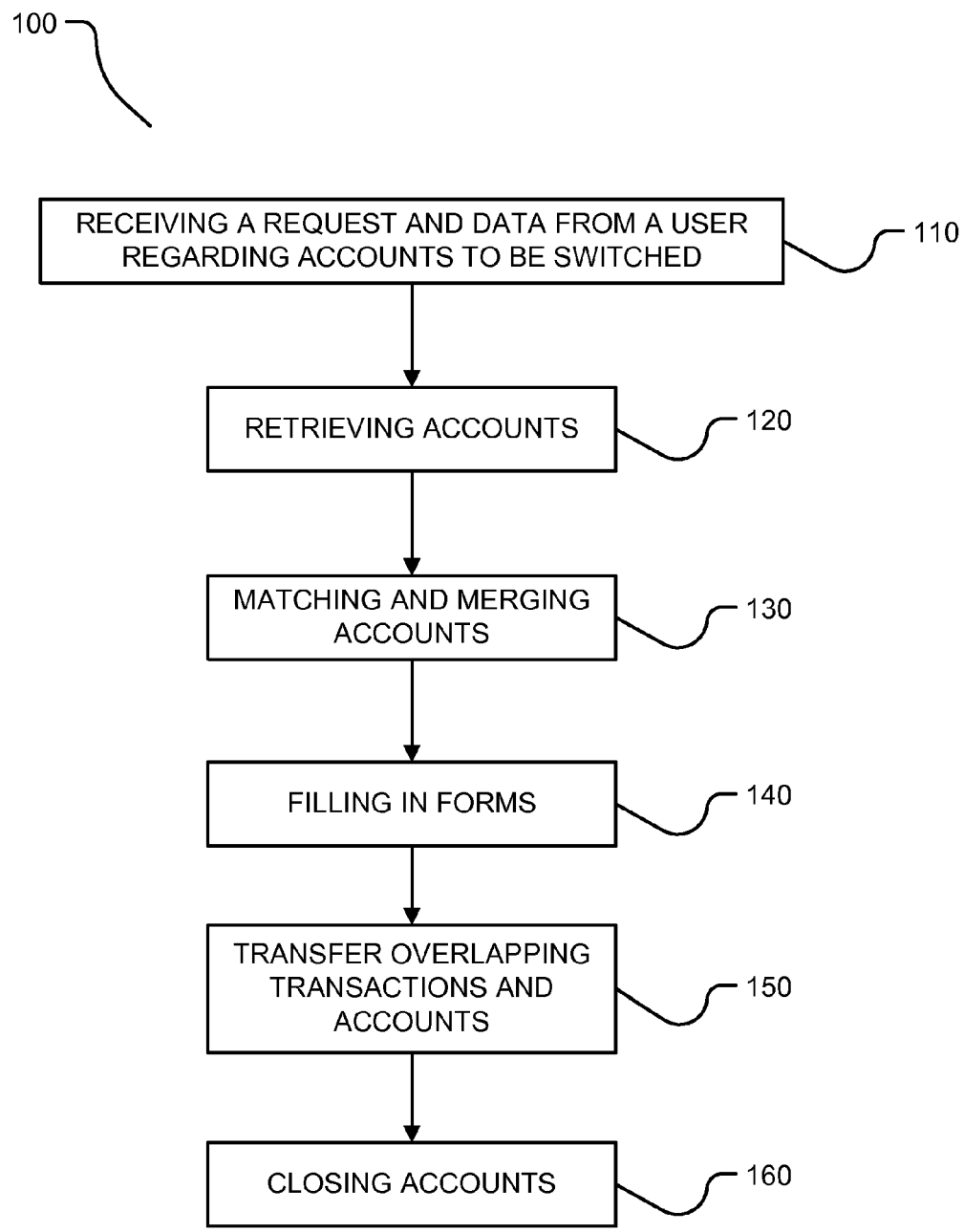
FIG. 1 illustrates a flow chart of an implementation of a method and system for moving at least one account from one financial institution to another over a network of computers in accordance with the principles and teachings of the disclosure.

The disclosure extends to methods, systems, and computer based products for moving at least one account from one financial institution to another over a network of computers. In the following description of the disclosure, reference is made to the accompanying drawings, which form a part hereof, and in which is shown by way of illustration specific implementations in which the disclosure may be practiced. It is understood that other implementations may be utilized and structural changes may be made without departing from the scope of the disclosure.

In describing and claiming the subject matter of the disclosure, the following terminology will be used in accordance with the definitions set out below.

It must be noted that, as used in this specification and the appended claims, the singular forms "a," "an," and "the" include plural referents unless the context clearly dictates otherwise.

As used herein, the terms "comprising," "including," "containing," "characterized by," and grammatical equivalents thereof are inclusive or open-ended terms that do not exclude additional, unrecited elements or method steps.

As used herein, the phrase "consisting of" and grammatical equivalents thereof exclude any element or step not specified in the claim.

As used herein, the phrase "consisting essentially of" and grammatical equivalents thereof limit the scope of a claim to the specified materials or steps and those that do not materially affect the basic and novel characteristic or characteristics of the claimed disclosure.

As used herein, the term "user" is intended to denote a person or entity with the ability to initiate the methods described herein through a system as described herein.

As used herein, a "personal financial manager" and "PFM" is intended to mean some application or program that provides a user interface to a user while providing access to aggregators over a computer network.

In response to the problem of proliferation of user accounts, institutions (such as personal financial management providers) have provided many with a solution of bringing all of a user's financial and other account information together in a single location. Another problem is a user moving or switching accounts or account providers for one reason or another. The disclosure addresses the above noted problems using a method and system for moving at least one account from one institution to another over a network of computers as disclosed and described more fully herein.

The disclosure relates further to a method and system of taking two or more sets of data, including but not limited to financial account data, and running an analysis on categories or areas where the data might overlap. For example, data may be obtained for a specified date range of transactions. That data may then be used to determine the likelihood that the sets of data are the same original source of data. It will be appreciated that the determination may be based on a predetermined threshold, such that when the threshold is met there is no further confirmation, whether by a user or otherwise, that is needed and the accounts are determined to be the same or overlapping. However, when the threshold is not met, then further confirmation, whether from the user (account holder) or from some other source, must be obtained before confirming that the accounts are the same or overlapping. Other data points, in addition to any overlapped data, may also be used. In an example of financial account data, the other data points may include financial institution name, account number, account type, account description or similar data points without departing from the scope of the disclosure.

In an implementation and by way of a hypothetical example of the disclosure, a checking account from Acme Financial may be aggregated from a source, such as an Open Financial Exchange (OFX), over a period of time. However, if that institution's OFX server becomes unavailable for any reason, and a different aggregation or other source of information is switched, for example, to another aggregator source such as ByAllAccounts, then it may be advantageous for the old account data (from the OFX feed, which may go back months or years and may already include custom categorization, tagging, memos, splits and the like) to not just be replaced by the new data feed (which may only go back a month or two and clearly does not have the custom data), but to be merged with the new data. The problem is that the new data feed may not have the same fields available or may call those fields by different names or different identifying characteristics and therefore may determine that the new source is not just a new source for the same accounts at Acme Financial, but are mistaken as new accounts.

In an implementation and by way of further example of the disclosure, an aggregator or other financial institution, such as OFX as used in the implementation and example above, may have called the same checking account "Free Checking *0278" where the feed at ByAllAccounts, which was recently switched from another aggregator source, may call it "Acme FreeChecking *0278." In an implementation of the disclosure, the system needs to know that the plurality of accounts, for example two accounts, although identified as being slightly different, or in some instances completely different, are actually the exact same account at Acme Financial. In an implementation and example of the disclosure, the account holder or end-user and the plurality of accounts, for example two accounts, should be merged together complete with the transactions within the account.

It will be appreciated that the disclosure uses an algorithm for determining if the plurality of accounts, for example two accounts, are in fact the same and also determines the probability of the accounts being the same using several factors or indicators. The probability may then be compared against a threshold to determine or confirm accuracy that the accounts are the same. Thus, the algorithm processes, matches and merges a plurality of accounts, whether financial accounts, email accounts, frequent flyer accounts or other account types, to assist a user in switching accounts from one institution to another.

Once the plurality of accounts, for example two accounts, are determined as being the same account based on the algorithm, then the overlapping transactions themselves are matched, and then the accounts may be merged into one and the same account at a new financial institution or otherwise. The result is to allow the new, more reliable, or at least, up-to-date aggregation source to have all the old data with the custom additions appended to the new data.

Referring now to FIG. 1, a method and system for moving at least one account from one institution to another, such as a financial institution, over a network of computers in a computing environment will be discussed. As illustrated, the method 100 may comprise receiving into computer memory a request from a user to move at least one account, or a plurality of accounts, between a first institution and a second institution at 110. It will be appreciated that the institution may also be a data aggregator, or may be a financial institution itself, or other institutions that provide user accounts without departing from the scope of the disclosure. At 120, information and data relating to the at least one old account, which may correspond to the request from the user, is retrieved and stored in computer memory. The old account data corresponding to the request may be retrieved from the first institution and the old account data may be stored into computer readable memory. The data retrieved may include, but is not limited to, account numbers, transaction types, transaction categories, transaction, classification, as well as details relating to the transaction, such as the description of the transaction, the date of the transaction, the amount of the transaction and so forth depending upon the type of account.

At 130, the retrieved data and information from the accounts may be matched to determine whether the accounts are the same. Often the aggregated data entries will have discrepancies in form that are not an exact match even for the same transaction. In such a case, these systems may accept entries that differ within a threshold amount as the same entry, rather than seeing them as duplicate entries. In other words, if the account data and information meet a certain threshold for accuracy, which may be a predetermined threshold (such as, for example, 80% or greater field match) or a threshold determined on the fly, then the accounts are verified or confirmed as being the same account and the data and information are merged together. It will be appreciated that field values from the old account data retrieved from computer memory may be scraped for data values, and the data values that are obtained from the field values may be stored in computer readable memory.

At 140, forms or other documentation to open or create a new account may be filled out automatically. The field values stored at 130 may be retrieved from computer memory and the form fields may be automatically populated. Additionally, based on the information provided by the user or the form fields may be manually populated in the new account with scraped field values as required by the second institution in order to create the at least one new account with the second institution.

At 150, account information and data is transferred from the old account at the first institution to the new account at the second institution. At 160, the corresponding old account at the first institution may be closed or otherwise merged into the new account.

Figure 2:
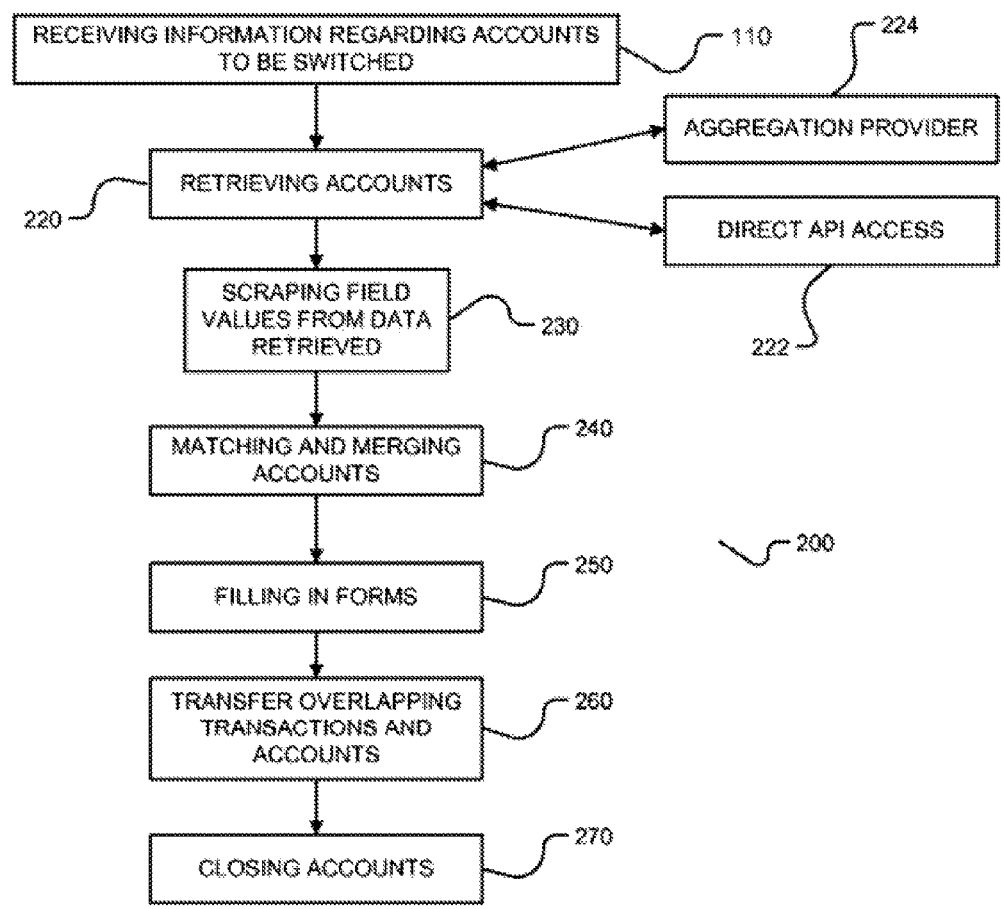
FIG. 2 illustrates a flow chart of an implementation of a method and system for moving at least one account from one financial institution to another over a network of computers using an aggregation provider or direct access with an application programming interface in accordance with the principles and teachings of the disclosure.

Referring now to FIG. 2, it will be appreciated that the method 200 and system may be similar to that illustrated in FIG. 1 with the following distinctions. In an implementation of the retrieval process at 220, the old account data may be retrieved through a direct application programming interface (API) at 222. In an implementation of the retrieval process at 220, the old account data may be retrieved from an aggregation provider at 224. In an implementation at 220, the old account data may be retrieved from a combination of both a direct application programming interface and from an aggregation provider. At 230, the field values from the old account data may be retrieved from computer memory and scraped. The data obtained or scraped from the field values may be stored in computer readable memory for later use in matching and merging at 240. At 250, forms may be automatically or manually filled out. Form fields within the new account may be populated with field values retrieved from the computer memory as required by the second institution in order to create the at least one new account with the second institution.

At 260, account information and data is transferred from the old account at the first institution to the new account at the second institution. At 270, the corresponding old account at the first institution may be closed or otherwise merged into the new account.

Figure 3:
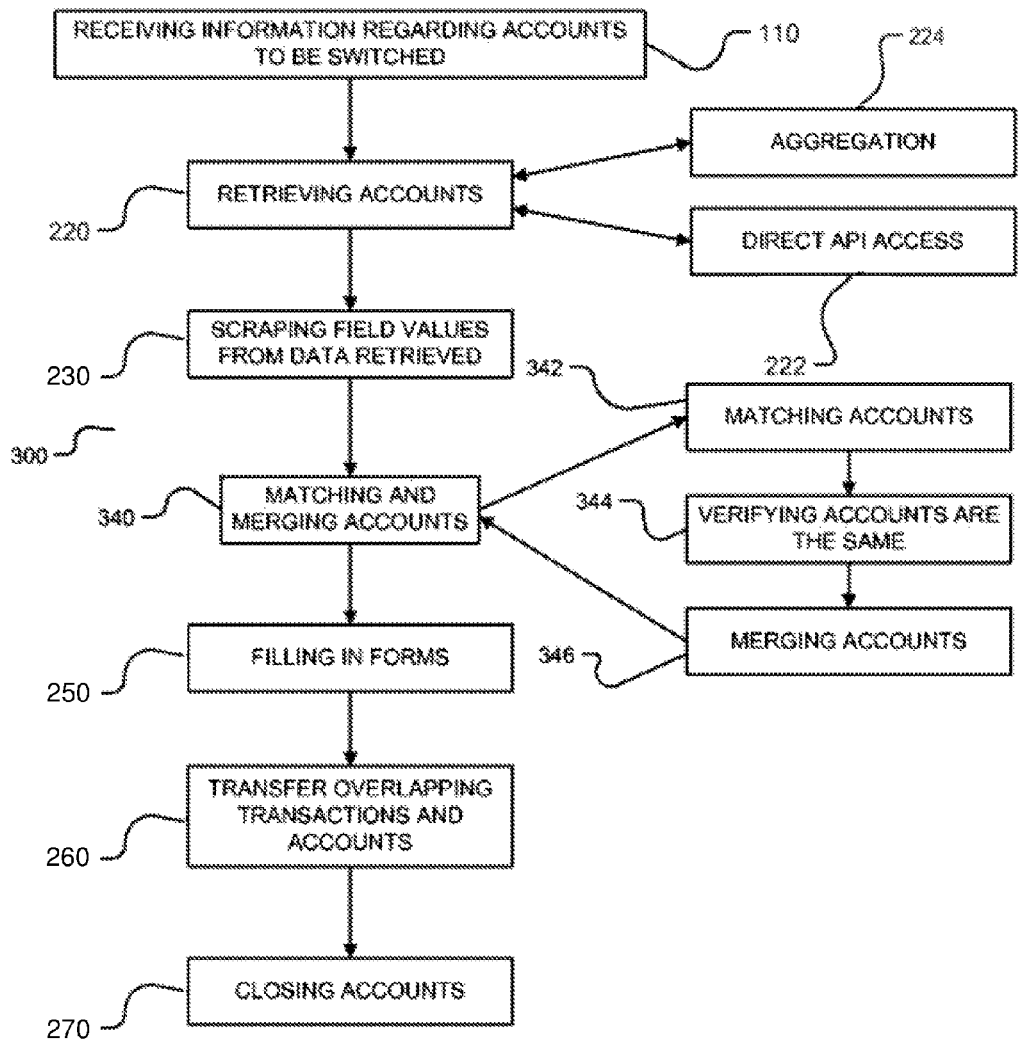
FIG. 3 illustrates implementations of a method and system for moving at least one account from one financial institution to another over a network of computers in accordance with the principles and teachings of the disclosure.

Referring now to FIG. 3, it will be appreciated that the method 300 and system may be similar to that illustrated in FIGS. 1-2 with the following distinctions. The process of matching and merging account data and information at 340 may include matching the account data by overlaying transaction data during a certain, specified period of time to determine matches at 342. Once the account information has been matched at 342, there may be a verification process at 344 to determine whether the accounts are the same. In an implementation, the verification may be a prompt provided to a user to verify that the accounts are the same, or the verification may be financial transaction comparisons, or the verification may be some combination of the above, or any other verification process. At 346, the verified accounts may be merged into one account.

In an implementation, the system and method of determining whether the plurality of accounts are in fact the same or not may be determined based on a probability that the accounts are the same account. Several factors may be used to make the determination that the accounts are the same. It will be understood that any system and method that includes any formula for determining whether the accounts are the same may be implemented into and utilized by the disclosure, and the disclosure is not limited by the examples discussed herein.

Once the plurality of accounts, for example two accounts, are determined as being the same, the overlapping transactions themselves may be matched and transferred. Then the accounts may be merged into one and the same account. The result is to allow a new, more reliable, up-to-date, or simply selected aggregation source to have all the old data from the first institution with any and all of the custom additions appended to the new data and new account at the second institution. Therefore, when it is desired to switch data aggregators or institutions or otherwise, it is typically desirable to keep the historical data from the previous aggregator, institution or otherwise and to merge with it or append to it the data from the new aggregator, new institution or otherwise.

It will be appreciated that due to differences in the type of data organization used by different aggregators, or institutions, and differences in the descriptions or names of the fields of data, it may not be immediately apparent whether the data fields match or not. The disclosure analyzes and assesses sample transactions from the data from the plurality of aggregators, or institutions, for example two institutions, and compare fields for a match. For example, the last 10 transactions or a specified a date range, for example 30 days, 60 days, 90 days, 120 days etc., depending on the type of transaction and the regularity or occurrence of the transactions, may be compared. If those transactions match for a large percentage of the fields compared, then the system can conclude that it is highly likely or probable that the accounts are the same. If the accounts are viewed as likely being the same then the system can reformat the data if necessary and, where appropriate and/or desired, merge the data from the plurality of aggregators or institutions. For example, if the system determines that fields determined by a user to be important fields, such as transaction description, transaction amount, transaction date, vendor, etc., match for several transactions, then a match may be determined to have occurred and the data may be merged.

This process can be viewed as a field-by-field match or overlay. In an implementation, the system may conclude that there is a match if a certain specified percentage of the fields (or verification criteria) match or is larger than a threshold, such as 80%, or between 80% and 99%, including all percentages in between, or some other desired match success threshold. It will be appreciated that the threshold may be any suitable measure or range, and may be predetermined or may be adjusted on the fly without departing from the scope of the disclosure. In an implementation, thresholds may be adjusted to control the output of any given process within the disclosure. For example, in a situation where a user is able to check the accuracy of the matching, the number of transactions to check can be limited by tightening the threshold during operation of the method.

Figure 4:
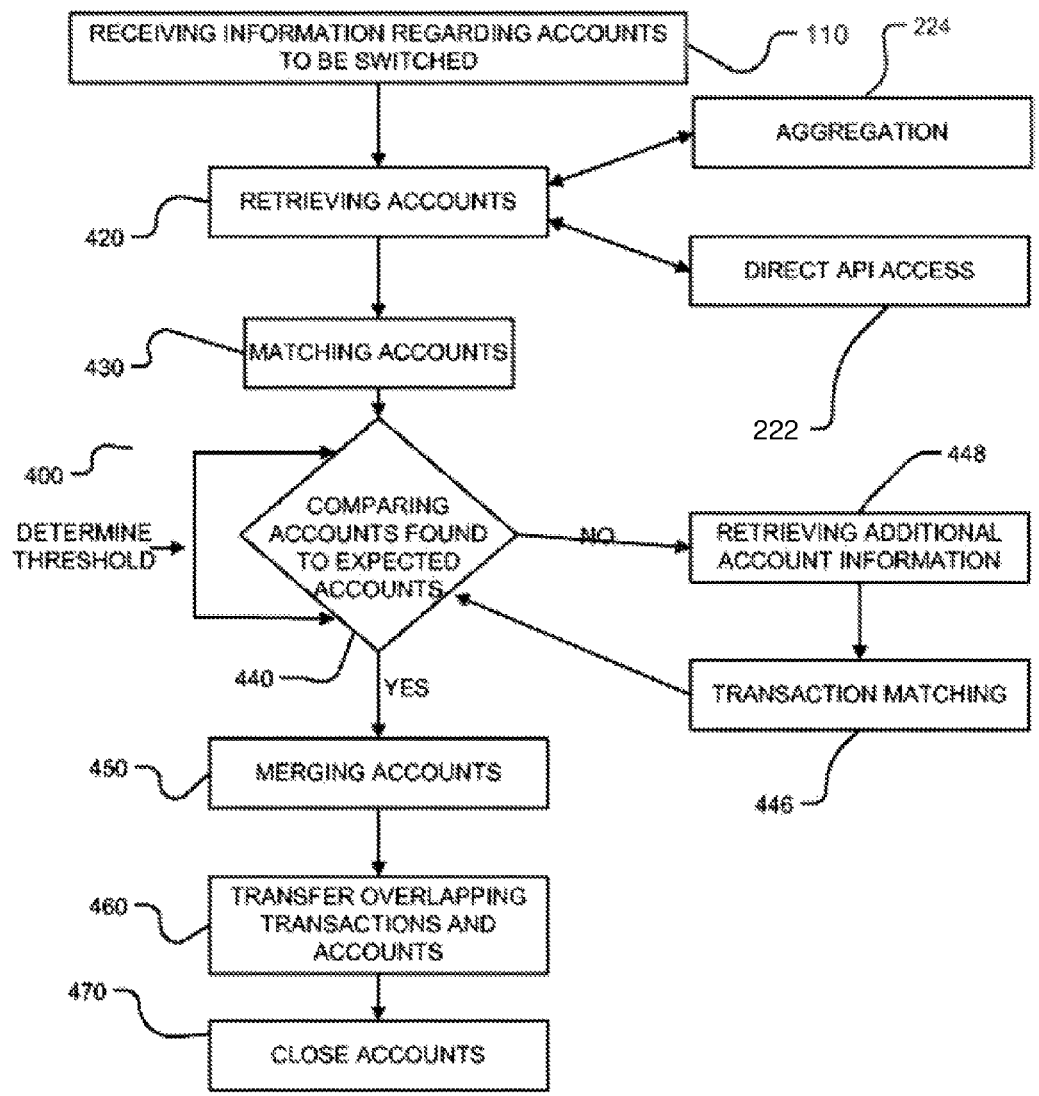
FIG. 4 illustrates a flow chart of an implementation of a method and system for moving at least one account from one financial institution to another over a network of computers where user accounts are compared to expected or anticipated account information using transaction matching in accordance with the principles and teachings of the disclosure.

Referring now to FIG. 4, it will be appreciated that the method and system 400 may be similar to that illustrated in FIGS. 1-3 with the following distinctions. The process of matching a plurality of user specified anticipated accounts to a plurality of old accounts by comparing account data of the old accounts to attributes of the user specified accounts is illustrated at 440. As illustrated in the figure, if after the old account information is retrieved at 420, initially matched at 430 and it is determined at 440 that the threshold is not met then additional account information, such as transaction data, may be retrieved, scraped, pulled and compared. The process of layering over data or overlaying transaction data during a certain period of time, such as a 30 day window or a 60 day window depending upon the number and regularity of transactions, to determine matches at 430, 440 and whether to merge accounts at 450 is within the scope of the disclosure. For example, distinctive fields may be retrieved at 448 and compared from a plurality of accounts, for example two accounts, using transaction matching at 446 such that the accounts may be identified as being potentially the same account, but that may not initially meet a determined threshold. The comparison may help confirm or verify that the accounts are in fact the same and can be merged at 450 based on additional information retrieved at 448 that may be compared and matched at 446. The distinctive fields that may be compared may include, but are not limited to, dates of the transactions, descriptions of the transactions, amounts of the transactions, and other identifying information, which may be overlaid.

It will be appreciated that the data contained in the distinctive fields of a transaction may be displayed differently by different aggregators or institutions. The display of the transaction data may depend upon a number of factors, including the type of transaction (debit card, credit card, check, deposit, etc.), the processor of the transaction, or the aggregator that pulled in the data because different aggregators may be pulling descriptions of the transaction, amounts of the transaction, and other identifying information from different sources. In any event, the differently displayed data may be combined or overlaid with where the account information was found, the account type, and what other accounts are already at the aggregator or at the institution or any combination of the above. Depending on the threshold, which can be determined on the fly or may be predetermined based on statistical probabilities, if the match is still below a certain threshold then the match may need a human confirmation prompting and asking the user whether or not to merge the accounts. Once the transaction matching has occurred and the statistical probability has increased above the threshold or the user has verified the accuracy, then the accounts may be merged at 450 and accounts transferred at 460 and/or closed at 470 as illustrated.

Thus, the plurality of old accounts may be compared to the plurality of user specified anticipated accounts using a predetermined matching threshold. At 448, the process may further comprise retrieving additional old account data if the predetermined matching threshold is not satisfied and comparing old accounts to anticipated accounts using the predetermined matching threshold. The additional old account data may comprise transaction data corresponding to each of the old accounts in order to better identify and match specific accounts. The process may further comprise using a predetermined or dynamic matching threshold for comparing individual transactions within the transaction data corresponding to each of the old accounts. If the threshold is determined as being met initially or at any time during the process at 440, then the accounts are merged at 450.

Figure 5:
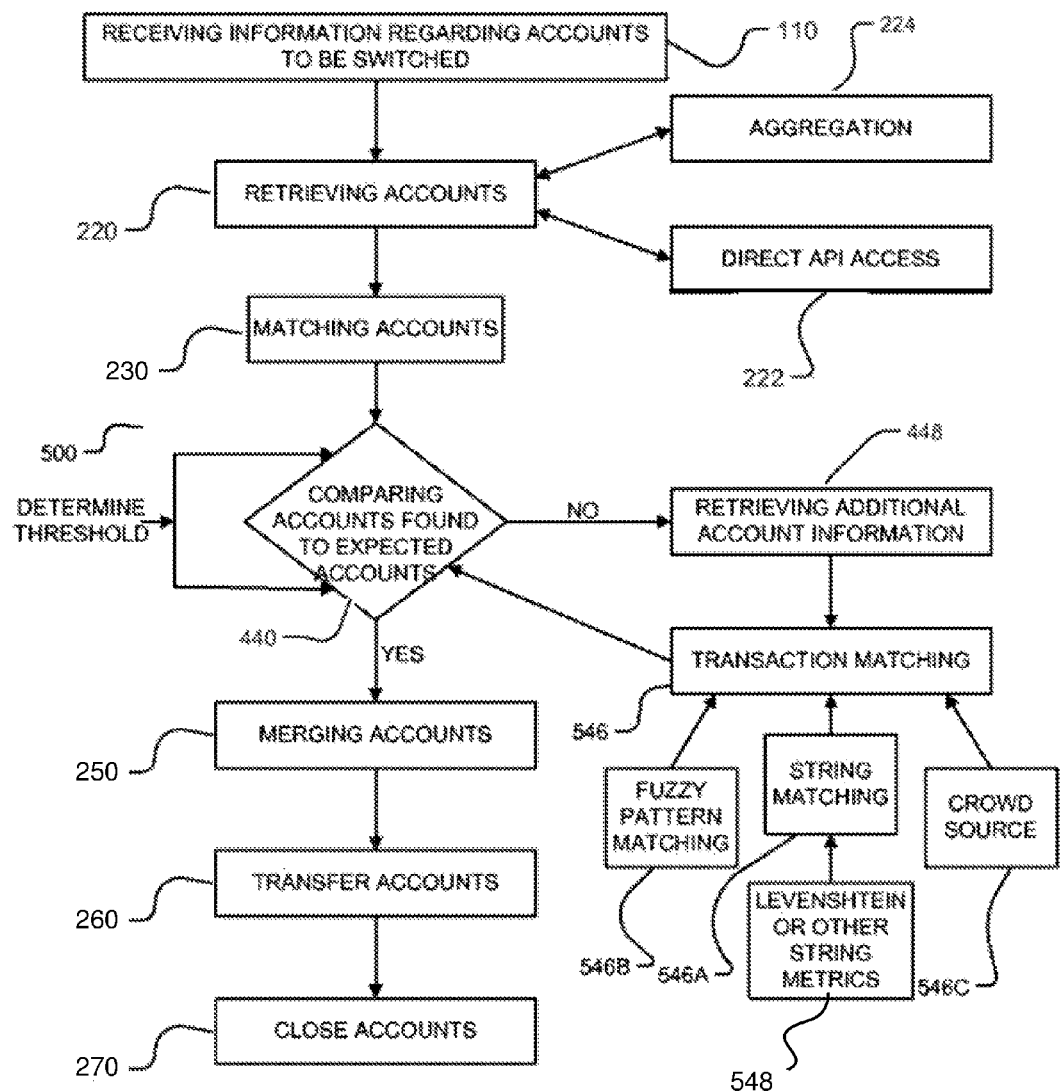
FIG. 5 illustrates a flow chart of an implementation of a method and system for moving at least one account from one financial institution to another over a network of computers where user accounts are compared to expected or anticipated account information using fuzzy pattern matching, string matching, such as a Levenshtein model or other string matching, or crowd sourcing in accordance with the principles and teachings of the disclosure.

Referring now to FIG. 5, it will be appreciated that the method 500 and system may be similar to that illustrated in FIGS. 1-4 with the following distinctions. In an implementation illustrated in the figure, the process of transaction matching at 546 the individual transactions within the transaction data may be accomplished using string matching at 546A. In an implementation illustrated in the figure, the individual transactions within the transaction data may be matched using fuzzy pattern matching at 546B. In an implementation illustrated in the figure, the individual transactions within the transaction data may be matched using crowd sourcing at 546C. It will be appreciated that in an implementation any of the above or any combination of the above matching models may be utilized by the disclosure, including the Levenshtein model or other string metrics 548 without departing from the scope of the disclosure.

Figure 6:
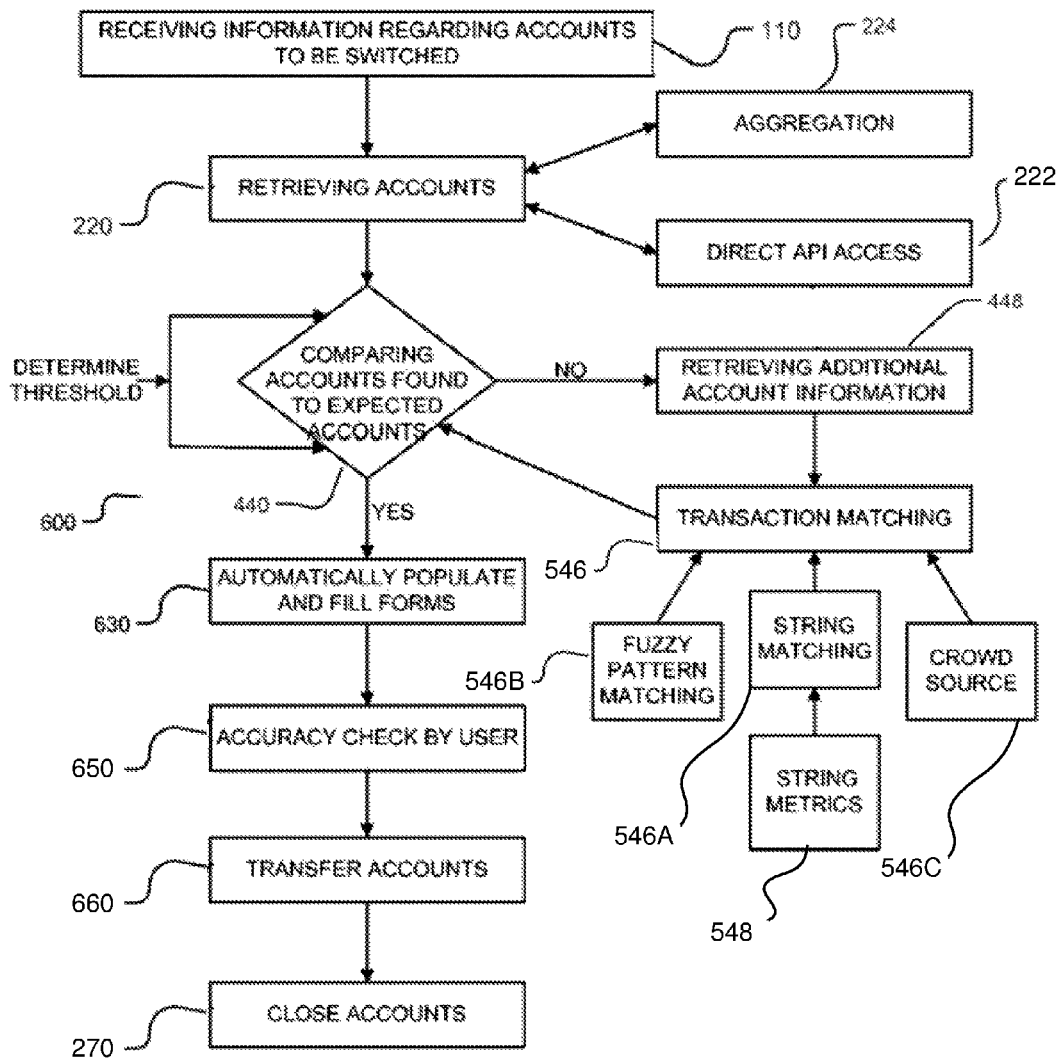
FIG. 6 illustrates a flow chart of an implementation of a method and system for moving at least one account from one financial institution to another over a network of computers where user accounts are compared to expected or anticipated account information using transaction matching and also implementing an accuracy check by the user in accordance with the principles and teachings of the disclosure.
Figure 7:
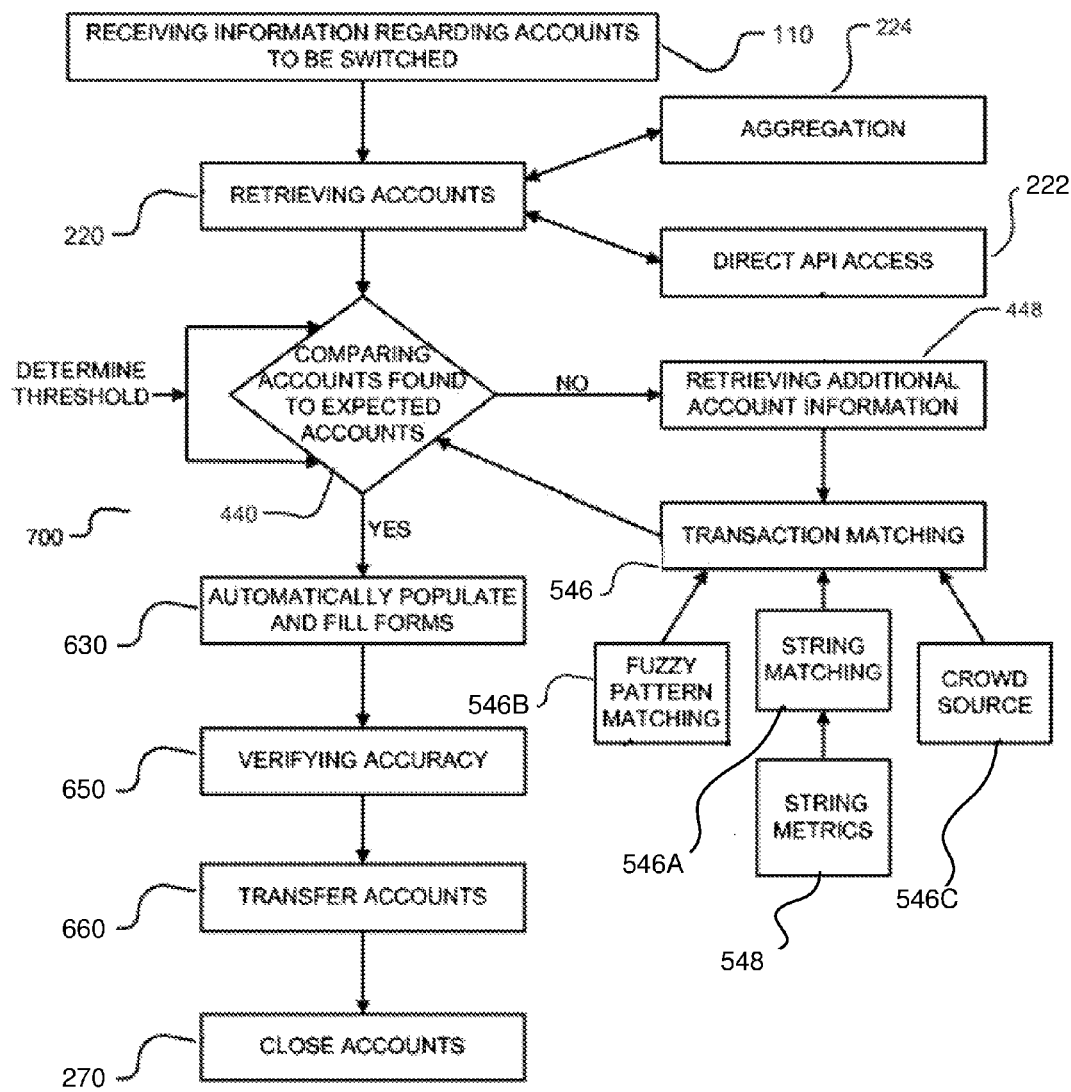
FIG. 7 illustrates a flow chart of an implementation of a method and system for moving at least one account from one financial institution to another over a network of computers where user accounts are compared to expected or anticipated account information using transaction matching and also verifying the accuracy of the comparison in accordance with the principles and teachings of the disclosure.

Referring now to FIGS. 6-7, it will be appreciated that the method and system may be similar to that illustrated in FIGS. 1-5 with the following distinctions. The method and system 600 may output populated form fields of the new accounts to a user at 630 for accuracy verification or confirmation by a user at 650 to merge or otherwise transfer the accounts at 660 as illustrated best in FIG. 6. In FIG. 7, the method and system 700 may comprise checking the populated form fields for accuracy using any statistical or other known method.

Figure 8:
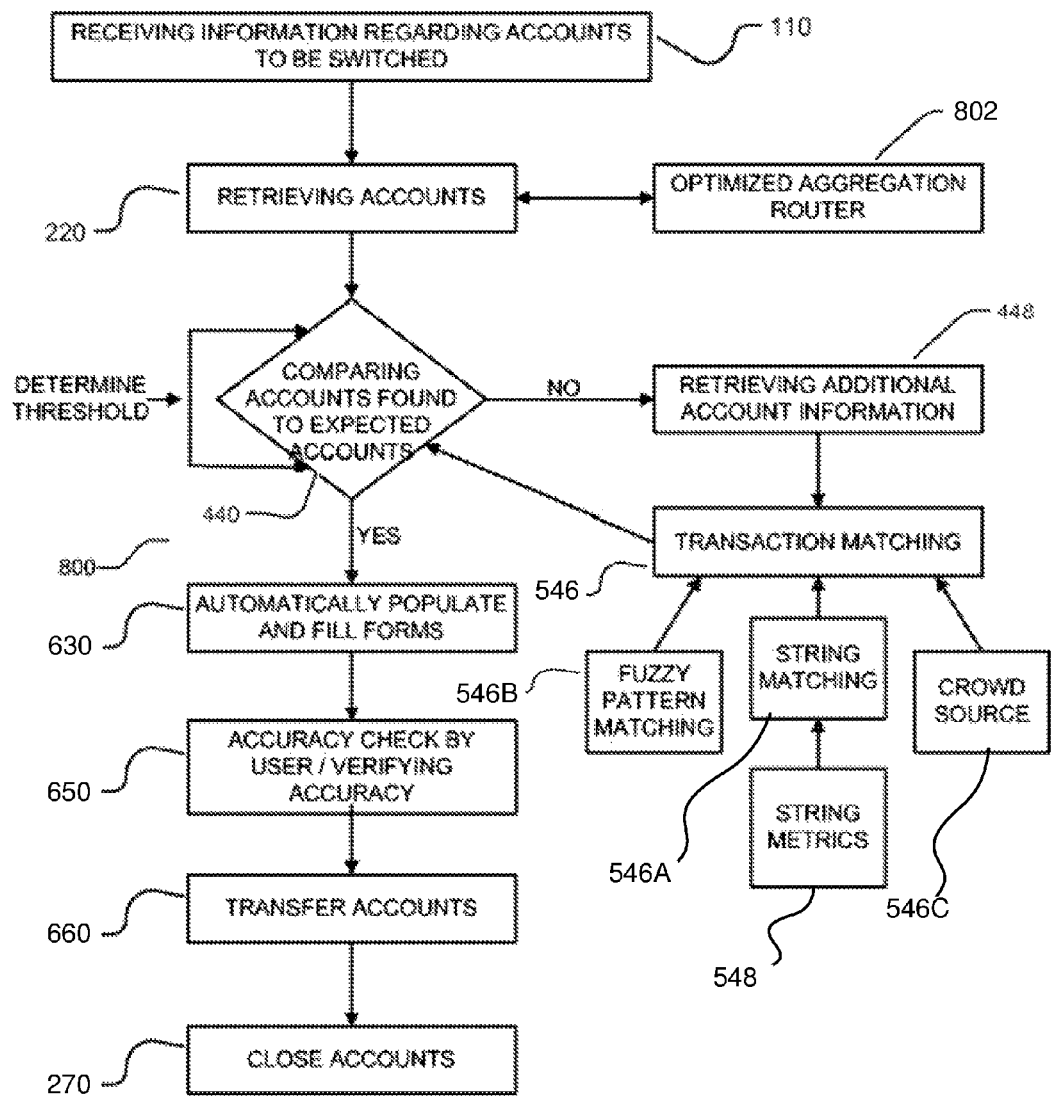
FIG. 8 illustrates a flow chart of an implementation of a method and system for moving at least one account from one financial institution to another over a network of computers using an optimized aggregation router to collect user account information and data where user accounts are compared to expected or anticipated account information using transaction matching and also implementing an accuracy check by the user in accordance with the principles and teachings of the disclosure.
Figure 9:
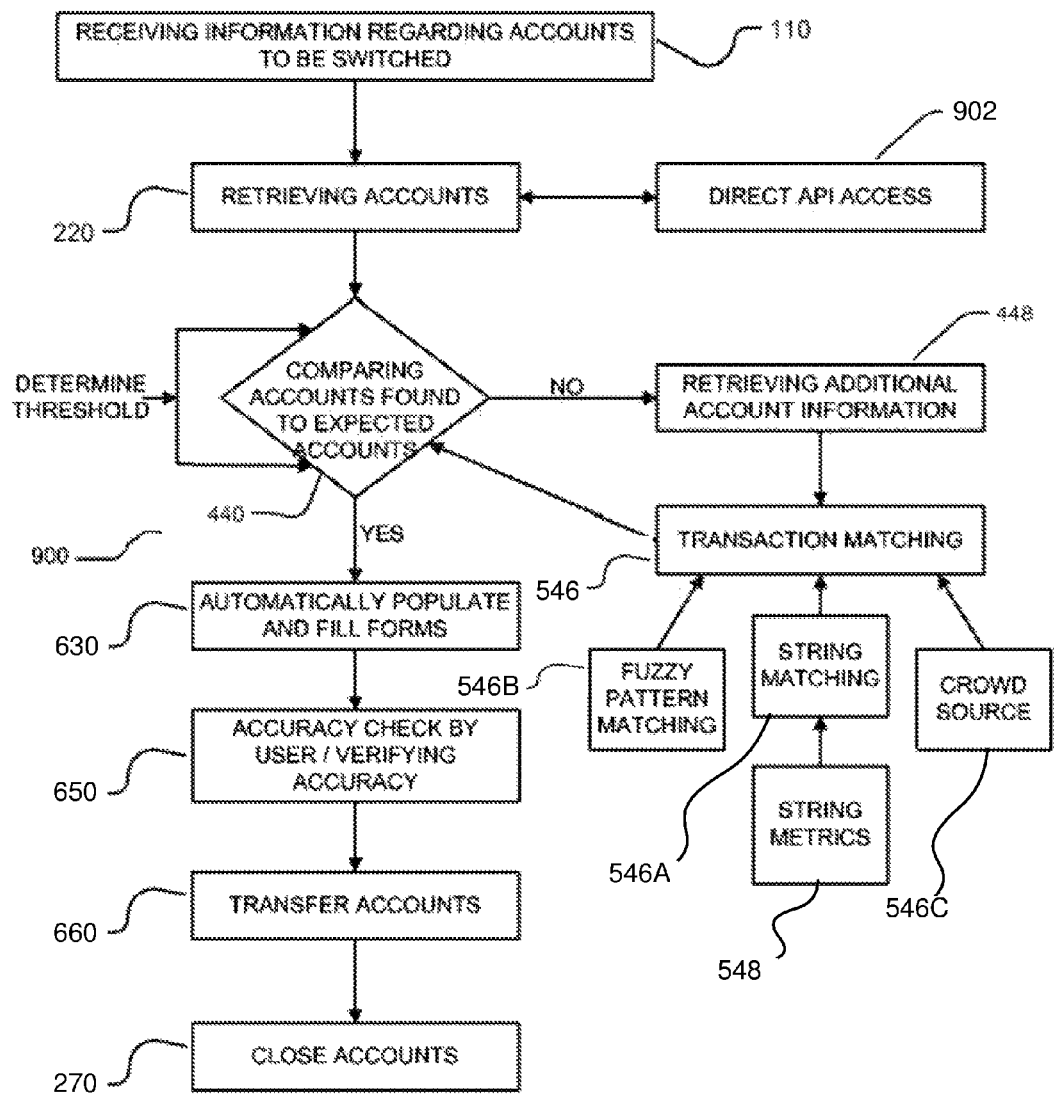
FIG. 9 illustrates a flow chart of an implementation of a method and system for moving at least one account from one financial institution to another over a network of computers using direct access with an application programming interface to collect user account information and data where user accounts are compared to expected or anticipated account information using transaction matching and also implementing an accuracy check by the user in accordance with the principles and teachings of the disclosure.

Referring now to FIGS. 8 and 9, it will be appreciated that the method and system may be similar to that illustrated in FIGS. 1-7 with the following distinctions. Referring now to FIG. 8, there is illustrated a flow chart of an implementation of a method and system 800 for moving at least one account from one institution to another over a network of computers using an optimized aggregation router 802 to collect user account information and data where user accounts are compared to expected or anticipated account information using transaction matching and also implementing an accuracy check by the user in accordance with the principles and teachings of the disclosure. The method and system may further comprise selecting an optimal aggregation router 802 dependent on the first institution and the old account data and attributes.

Referring now to FIG. 9, there is illustrated a flow chart of an implementation of a method and system 900 for moving at least one account from one institution to another over a network of computers using direct access 902 with an application programming interface to collect user account information and data where user accounts are compared to expected or anticipated account information using transaction matching and also implementing an accuracy check by the user in accordance with the principles and teachings of the disclosure. The method and system may further comprise directly accessing 902 the application programming interface of an institution dependent on the first institution and the old account data and attributes.

Figure 10:
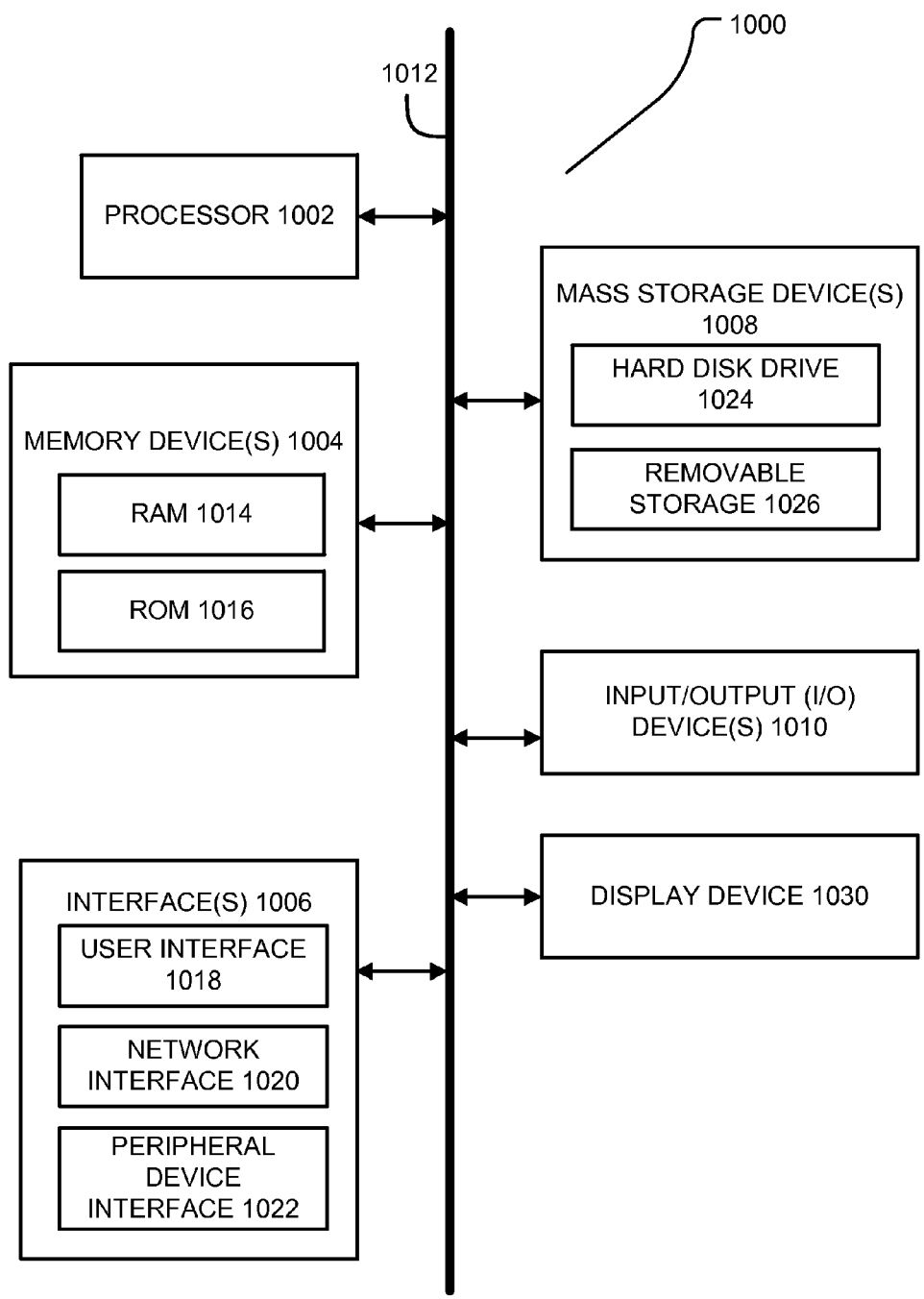
FIG. 10 illustrates various hardware components utilized in the system for moving at least one account from one financial institution to another over a network of computers in accordance with the principles and teachings of the disclosure.
Figure 11:
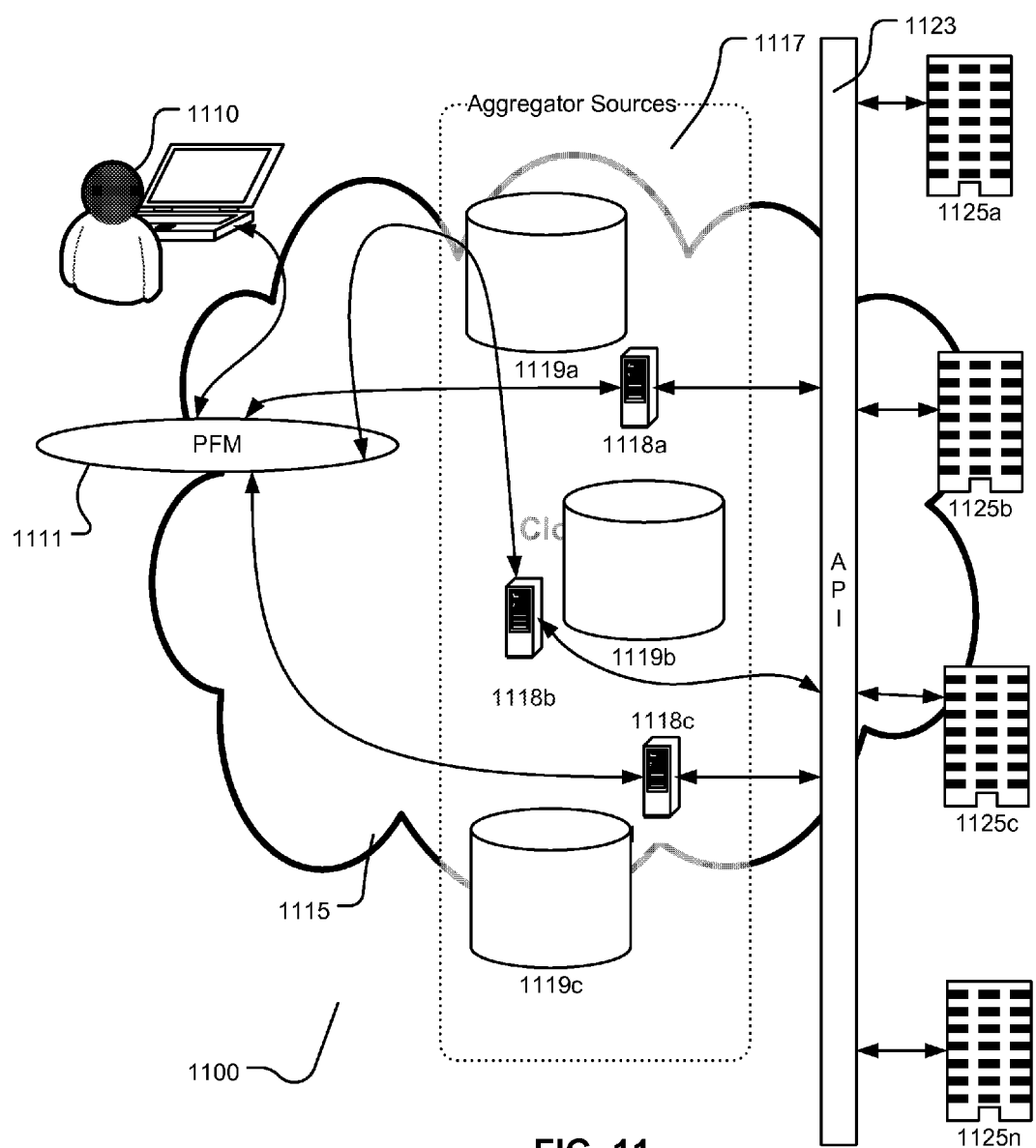
FIG. 11 illustrates an implementation of an exemplary computing network that may be used by the financial industry in accordance with the principles and teachings of the disclosure.

Referring now to FIGS. 10-11, there are illustrated a schematic representation of computer hardware and protocols that enable the various implementations disclosed herein. FIG. 11 illustrates an implementation of an exemplary computing network that may be used by the financial industry. As can be seen in the figure, a user 1110 may be in electronic communication through a computing network 1115 with a plurality of financial institutions 1125a, 1125b, 1125c . . . 1125n. The user 1110 may access the network 1115 through a personal financial manager (PFM) 1111 that may be provided by one of the financial institutions 1125 or may be provided by a third party provider. In order to make use of the vast amounts of financial data available from the various financial institutions 1125, a plurality of aggregation sources 1117 may be used by the system to aggregate financial information through an application program interface (API) 1123. As illustrated, the aggregation sources may utilize computing components such as servers 1118a, 1118b, 1118c each managing databases 1119a, 1119b, 1119c. It should be noted that in some implementations, the network may be the internet or alternatively the network may be a proprietary network system. The network 1115 may operate according to typical networking protocols and security programs as is known in the industry.

Implementations of the disclosure may comprise or utilize a special purpose or general-purpose computer, including computer hardware, such as, for example, one or more processors and system memory, as discussed in greater detail below. Implementations within the scope of the disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

It will be appreciated that a "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmission media can include a network and/or data links, which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures that can be transferred automatically from transmission media to computer storage media (devices) (or vice-versa). For example, computer-executable instructions or data structures received over a network or data link can be buffered in RAM within a network interface module (e.g., an "NIC"), and then eventually transferred to computer system RAM and/or to less volatile computer storage media (devices) at a computer system. RAM can also include solid state drives (SSDs or PCIx based real time memory tiered storage, such as FusionIO). Thus, it should be understood that computer storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, hand pieces, multi-processor systems, microprocessor-based or programmable consumer electronics, network PCs, minicomputers, mainframe computers, mobile telephones, PDAs, tablets, pagers, routers, switches, various storage devices, and the like. It should be noted that any of the above mentioned computing devices may be provided by or located within a brick and mortar location. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) or field programmable gate arrays (FPGAs) can be programmed to carry out one or more of the systems and procedures described herein. Certain terms are used throughout the following description and Claims to refer to particular system components. As one skilled in the art will appreciate, components may be referred to by different names. This document does not intend to distinguish between components that differ in name, but not function.

Referring specifically now to FIG. 10, there is illustrated a block diagram of an example computing device 1000. Computing device 1000 may be used to perform various procedures, such as those discussed herein. Computing device 1000 can function as a server, a client, or any other computing entity. Computing device 1000 can perform various monitoring functions as discussed herein, and can execute one or more application programs, such as the application programs described herein. Computing device 1000 can be any of a wide variety of computing devices, such as a desktop computer, a notebook computer, a server computer, a handheld computer, tablet computer and the like.

Computing device 1000 includes one or more processor(s) 1002, one or more memory device(s) 1004, one or more interface(s) 1006, one or more mass storage device(s) 1008, one or more Input/Output (I/O) device(s) 1010, and a display device 1030 all of which are coupled to a bus 1012. Processor(s) 1002 include one or more processors or controllers that execute instructions stored in memory device(s) 1004 and/or mass storage device(s) 1008. Processor(s) 1002 may also include various types of computer-readable media, such as cache memory.

Memory device(s) 1004 include various computer-readable media, such as volatile memory (e.g., random access memory (RAM) 1014) and/or nonvolatile memory (e.g., read-only memory (ROM) 1016). Memory device(s) 1004 may also include rewritable ROM, such as Flash memory.

Mass storage device(s) 1008 include various computer readable media, such as magnetic tapes, magnetic disks, optical disks, solid-state memory (e.g., Flash memory), and so forth. As shown in FIG. 10, a particular mass storage device is a hard disk drive 1024. Various drives may also be included in mass storage device(s) 1008 to enable reading from and/or writing to the various computer readable media. Mass storage device(s) 1008 include removable media 1026 and/or non-removable media.

I/O device(s) 1010 include various devices that allow data and/or other information to be input to or retrieved from computing device 1000. Example I/O device(s) 1010 include cursor control devices, keyboards, keypads, microphones, monitors or other display devices, speakers, printers, network interface cards, modems, image capture devices, and the like.

Display device 1030 includes any type of device capable of displaying information to one or more users of computing device 1000. Examples of display device 1030 include a monitor, display terminal, video projection device, and the like.

Interface(s) 1006 include various interfaces that allow computing device 1000 to interact with other systems, devices, or computing environments. Example interface(s) 1006 may include any number of different network interfaces 1020, such as interfaces to local area networks (LANs), wide area networks (WANs), wireless networks, and the Internet. Other interface(s) include user interface 1018 and peripheral device interface 1022. The interface(s) 1006 may also include one or more user interface elements 1018. The interface(s) 1006 may also include one or more peripheral device interfaces 1022 such as interfaces for printers, pointing devices (mice, track pad, etc.), keyboards, and the like.

Bus 1012 allows processor(s) 1002, memory device(s) 1004, interface(s) 1006, mass storage device(s) 1008, and I/O device(s) 1010 to communicate with one another, as well as other devices or components coupled to bus 1012. Bus 1012 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 1000, and are executed by processor(s) 1002. Alternatively, the systems and procedures described herein can be implemented in hardware, or a combination of hardware, software, and/or firmware. For example, one or more application specific integrated circuits (ASICs) or field programmable gate arrays (FPGAs) can be programmed to carry out one or more of the systems and procedures described herein.

The foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate implementations may be used in any combination desired to form additional hybrid implementations of the disclosure.

Further, although specific implementations of the disclosure have been described and illustrated, the disclosure is not to be limited to the specific forms or arrangements of parts so described and illustrated. The scope of the disclosure is to be defined by the claims appended hereto, any future claims submitted here and in different applications, and their equivalents.

The invention claimed is:

1. A method for switching between data aggregator servers, the method comprising:

tracking a first financial account using a personal financial manager (PFM) server;

receiving, at the PFM server, first account identification data and first account transaction data for the first financial account from a first data aggregator server over a network;

receiving, at the PFM server, data that comprises one or more custom additions, the one or more custom additions comprising one or more of custom categorizations, taggings, memos, and splits that are related to the first account transaction data;

including, at the PFM server, the data comprising the one or more custom additions in the first account transaction data;

detecting, at the PFM server, that the first account transaction data from the first data aggregator server has become unavailable to the PFM server over the network and that a second data aggregator server is currently available to the PFM server over the network;

in response to the detecting, switching, at the PFM server, from the first data aggregator server to a second data aggregator server, the second data aggregator server configured to send data for at least some of the user's financial accounts that were accessible via the first data aggregator server, wherein at least a portion of the user's financial accounts accessible via the second data aggregator server comprise different data fields and/or different data formats than the user's financial accounts accessible via the first data aggregator server;

in response to the switching, receiving, at the PFM server, second account identification data and second account transaction data from the second data aggregator server over the network for one or more of the user's financial accounts accessible via the second data aggregator server;

comparing, at the PFM server, the first account identification data and the second account identification data against an identification threshold to determine if the second account identification data matches the first account identification data of the first financial account;

in response to determining that the second account identification data does not match the first account identification data of the first financial account, comparing, at the PFM server, the first account transaction data and the second account transaction data against a transaction threshold to determine if the second account transaction data matches the first account transaction data of the first financial account;

in response to determining that the second account transaction data does not match the first account transaction data of the first financial account, requesting, at the PFM server, confirmation from the user that the second account identification data and/or the second account transaction data match(es) the first account identification data of and/or the first account transaction data of the first financial account;

in response to receiving confirmation from the user that the second account identification data and/or the second account transaction data match the first account identification data of and/or the first account transaction data of the first financial account, merging, at the PFM server, the second account identification data and the second account transaction data with the first account identification data and the first account transaction data; and merging the data comprising the one or more custom additions that is included in the first account transaction data with the second account transaction data such that the one or more custom additions remains present in the merged data.

2. The method of claim 1, wherein the first account identification data and the second account identification data includes the following data for each account: account financial institution name, account number, account type, and account description.

3. The method of claim 1, wherein each of the first account transaction data and the second account transaction data includes the following data for each transaction: transaction date, transaction type, transaction description, and transaction amount.

4. The method of claim 1, wherein the detecting, at the PFM server, that the first account transaction data from the first data aggregator server has become unavailable over the network includes detecting, at the PFM server, that services over the network of the first data aggregator server have halted.

5. The method of claim 1, wherein the transaction threshold is predetermined.

6. The method of claim 1, wherein the transaction threshold is determined dynamically.

7. The method of claim 1, wherein the comparing, at the PFM server, of the first account transaction data and the second account transaction data against a transaction threshold includes employing, at the PFM server, Levenshtein string matching.

8. The method of claim 1, wherein the comparing, at the PFM server, of the first account transaction data and the second account transaction data against a transaction threshold includes employing, at the PFM server, fuzzy pattern matching.

9. The method of claim 1, wherein the comparing, at the PFM server, of the first account transaction data and the second account transaction data against a transaction threshold includes employing, at the PFM server, crowd sourcing matching.

10. The method of claim 1, wherein the comparing, at the PFM server, of the first account transaction data and the second account transaction data against a transaction threshold includes comparing, at the PFM server, a specific date range of transactions.

11. The method of claim 1, wherein the comparing, at the PFM server, of the first account transaction data and the second account transaction data against a transaction threshold includes comparing, at the PFM server, a specific number of recent transactions.

12. The method of claim 1, wherein the comparing, at the PFM server, of the first account transaction data and the second account transaction data against a transaction threshold includes comparing, at the PFM server, data fields specified by the user to be important fields.

13. The method of claim 1, wherein:
the first data aggregator server is configured to send data over the network for financial accounts using a first financial data feed having a first API; and
the second data aggregator server is configured to send data over the same network for the same financial accounts using a second financial data feed having a second API that is different from the first API.

14. A method for switching between data aggregator servers, the method comprising:
tracking a first financial account using a personal financial manager (PFM) server;
receiving, at the PFM server, first account identification data and first account transaction data for the first financial account from a first data aggregator server over a network;
receiving, at the PFM server, data that comprises one or more field values, the one or more field values comprising one or more of custom categorizations, taggings, memos, and splits that are related to the first account transaction data;
including, at the PFM server, the data comprising the one or more field values in the first account transaction data;
detecting, at the PFM server, that the first account transaction data from the first data aggregator server has become unavailable to the PFM server over the network and that a second data aggregator server is currently available to the PFM server over the network;
in response to the detecting, switching, at the PFM server, from the first data aggregator server to a second data aggregator server, the second data aggregator server configured to send data for at least some of the user's financial accounts that were accessible via the first data aggregator server, wherein at least a portion of the user's financial accounts accessible via the second data aggregator server comprise different data fields and/or different data formats than the user's financial accounts accessible via the first data aggregator server;
in response to the switching, receiving, at the PFM server, second account identification data and second account transaction data from the second data aggregator server over the network for one or more of the user's financial accounts accessible via the second data aggregator server;
comparing, at the PFM server, the first account identification data and the second account identification data against an identification threshold to determine if the second account identification data matches the first account identification data of the first financial account;
in response to determining that the second account identification data does not match the first account identification data of the first financial account, comparing, at the PFM server, the first account transaction data and the second account transaction data against a transaction threshold to determine if the second account transaction data matches the first account transaction data of the first financial account, the transaction threshold comprising a predetermined percentage of fields that match between the first account transaction data and the second account transaction data;
in response to determining that the second account transaction data does not match the first account transaction data of the first financial account, requesting, at the PFM server, confirmation from the user that the second account identification data and/or the second account transaction data match(es) the first account identification data of and/or the first account transaction data of the first financial account;
in response to receiving confirmation from the user that the second account identification data and/or the second account transaction data match the first account identification data of and/or the first account transaction data of the first financial account, merging, at the PFM server, the second account identification data and the second account transaction data with the first account identification data and the first account transaction data; and
merging the data comprising the one or more field values that is included in the first account transaction data with the second account transaction data such that the one or more field values remains present in the merged data.

15. A method for switching between data aggregator servers, the method comprising:
tracking a first financial account using a personal financial manager (PFM) server;
receiving, at the PFM server, first account identification data and first account transaction data for the first financial account from a first data aggregator server over a network using a first financial data feed having a first API;
receiving, at the PFM server, customized data generated by a user, the customized data related to the first account transaction data;
including, at the PFM server, data that comprises one or more custom additions, the one or more custom additions comprising one or more of custom categorizations, taggings, memos, and splits that are related to the first account transaction data;
detecting, at the PFM server, that the first account transaction data from the first data aggregator server has become unavailable to the PFM server over the network and that a second data aggregator server is currently available to the PFM server over the network;
in response to the detecting, switching, at the PFM server, from the first data aggregator server to a second data aggregator server, the second data aggregator server configured to send data for the at least some of the user's financial accounts that were accessible via the first data aggregator server, wherein at least a portion of the user's financial accounts accessible via the second data aggregator server comprise different data fields and/or different data formats than the user's financial accounts accessible via the first data aggregator server, the second data aggregator server using a second financial data feed having a second API that is different from the first API;

in response to the switching, receiving, at the PFM server, second account identification data and second account transaction data from the second data aggregator server over the network for one or more of the user's financial accounts accessible via the second data aggregator server;

comparing, at the PFM server, the first account identification data and the second account identification data against an identification threshold to determine if the second account identification data matches the first account identification data of the first financial account;

in response to determining that the second account identification data does not match the first account identification data of the first financial account, comparing, at the PFM server, the first account transaction data and the second account transaction data against a transaction threshold to determine if the second account transaction data matches the first account transaction data of the first financial account, the transaction threshold comprising a predetermined percentage of fields that match between the first account transaction data and the second account transaction data;

in response to determining that the second account transaction data does not match the first account transaction data of the first financial account, requesting, at the PFM server, confirmation from the user that the second account identification data and/or the second account transaction data match(es) the first account identification data of and/or the first account transaction data of the first financial account;

in response to receiving confirmation from the user that the second account identification data and/or the second account transaction data match the first account identification data of and/or the first account transaction data of the first financial account, merging, at the PFM server, the second account identification data and the second account transaction data with the first account identification data and the first account transaction data; and appending the data comprising the one or more custom additions that is included in the first account transaction data to the second account transaction data such that the one or more custom additions remains present in the merged data.

16. The method of claim 15, wherein the detecting, at the PFM server, that the first data aggregator server has become unavailable over the network includes detecting, at the PFM server, that services over the network of the first data aggregator server have halted.

* * * * *